FIG. I

INVENTOR.
JAMES H. GODFREY
BY Lindsey, Prutzman and Hays
ATTORNEYS

April 5, 1966  J. H. GODFREY  3,244,030

PORTABLE POWER TOOL

Original Filed Oct. 10, 1962  3 Sheets-Sheet 2

INVENTOR.
JAMES H. GODFREY

BY Lindsey, Prutzman and Hayes
ATTORNEYS

April 5, 1966 J. H. GODFREY 3,244,030
PORTABLE POWER TOOL
Original Filed Oct. 10, 1962
3 Sheets-Sheet 3
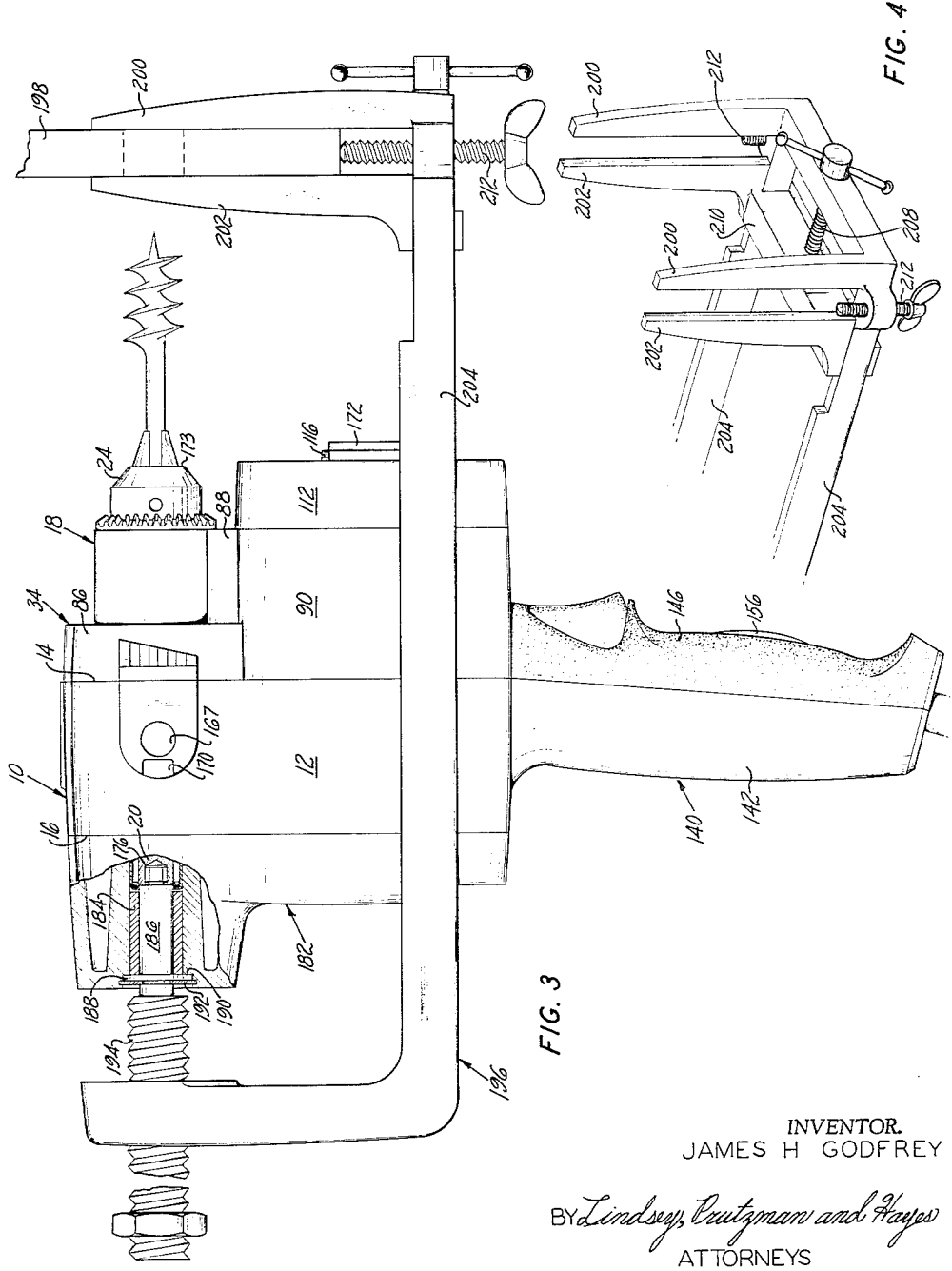
INVENTOR.
JAMES H GODFREY
BY Lindsey, Prutzman and Hayes
ATTORNEYS

United States Patent Office 3,244,030
Patented Apr. 5, 1966

3,244,030
PORTABLE POWER TOOL
James H. Godfrey, Berlin, Conn., assignor to The Stanley Works, New Britain, Conn., a corporation of Connecticut
Continuation of application Ser. No. 229,672, Oct. 10, 1962. This application Mar. 19, 1965, Ser. No. 443,775
7 Claims. (Cl. 77—7)

The present invention relates to protable power tools and, more particularly, to hand drills, and is a continuation of my application Serial No. 229,672, filed Oct. 10, 1962, now abandoned, and entitled Portable Power Tool.

A principal aim of this invention is to provide a compact and balanced portable drill which may be conveniently handled in unusual operating positions and in hard-to-reach locations.

Another aim of the present invention is to provide a portable hand drill having improved ease of control and versatility.

A further aim of this invention is to provide a hand drill combining the functions of both straight and right angle drills and which can be readily manipulated with substantial leverage for preventing hunting or misalignment of the drill supported bit and twisting of the drill during severe torque conditions.

A still further aim of the present invention is to provide a hand drill having a sturdy construction adapted for ready assembly and disassembly for economical manufacture and rapid maintenance and which, upon drill "break through," prevents shock to or damage of the drill and workpiece.

Another aim of this invention is to provide a hand drill with hand supports positioned for ensuring flexible control and operation.

Another aim of the present invention is to provide a hand drill which is adapted to facilitate drilling by removal of waste particles in the region of the drilling operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
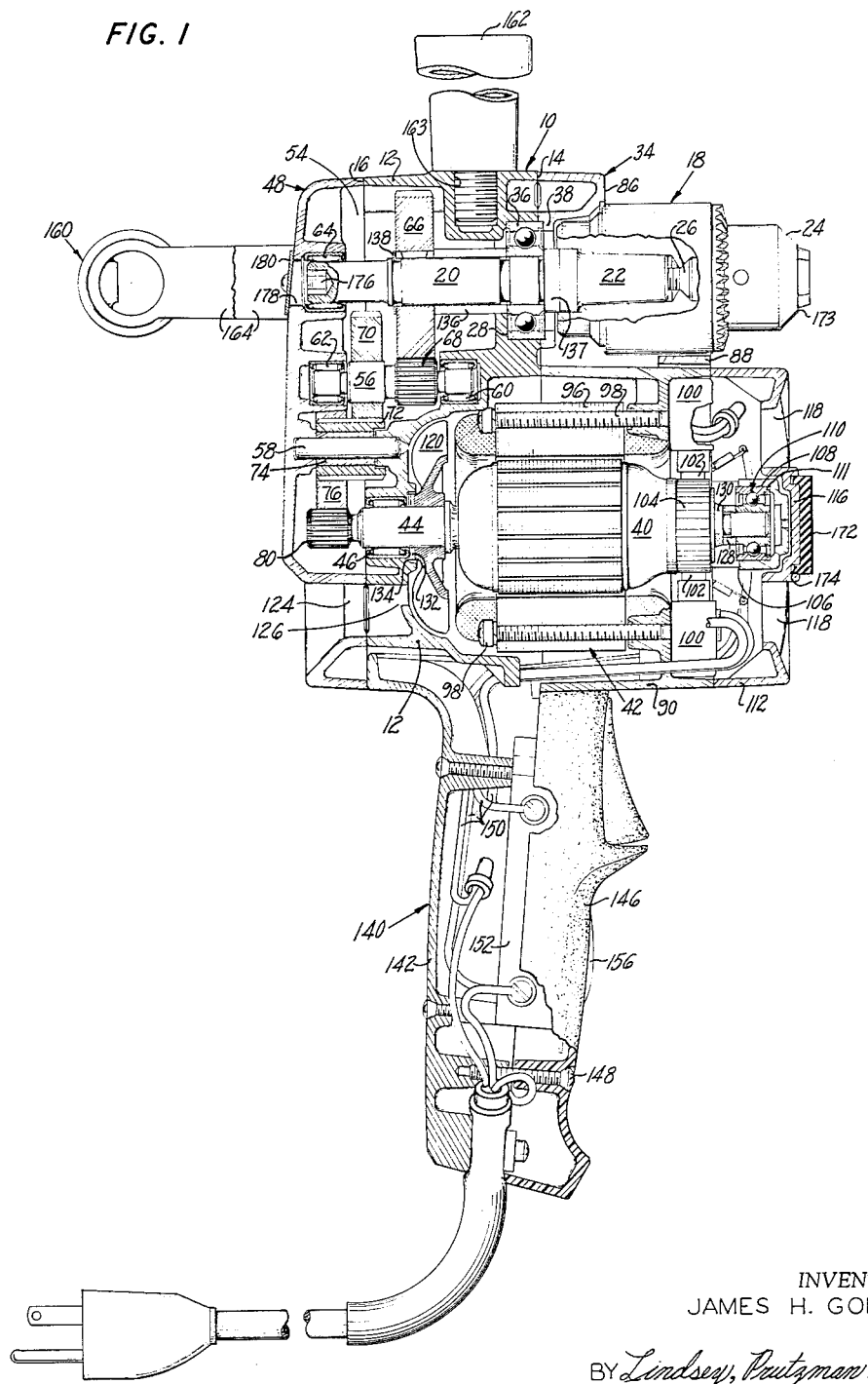
Figure 2:
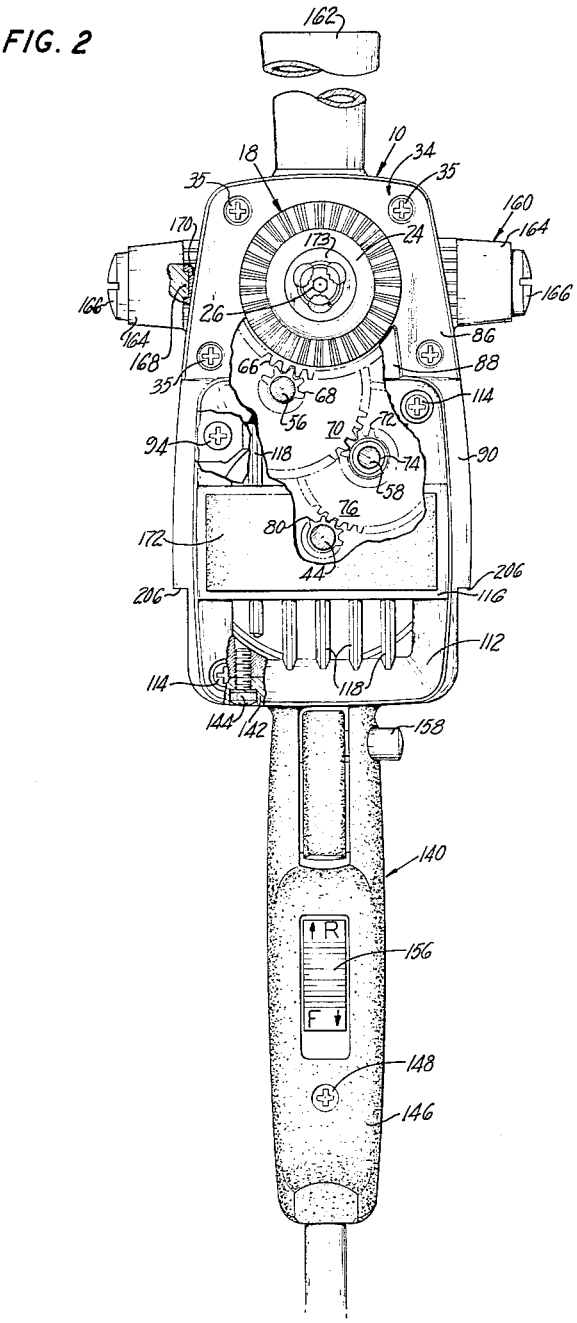

In the drawings:
FIG. 1 is a side elevation view, partly broken away and partly in section, of a hand drill of this invention;
FIG. 2 is a front elevation view, partly broken away and partly in section, of the hand drill;
FIG. 3 is a side elevation view, partly broken away and partly in section, of a modified hand drill and a drill supporting fixture; and
FIG. 4 is a partial perspective view of the supporting fixture.

Referring to the drawings in detail, a hand drill of this invention has an L-shaped housing designated by the numeral 10 which includes a generally rectangular gear housing 12 of aluminum having generally parallel faces 14 and 16 on the front and rear ends thereof. Rotatably mounted within the upper portion of the gear housing is a spindle assembly 18 with a spindle shaft 20 having a forwardly tapered end 22 for supporting a conventional chuck 24 which is shown detachably fixed thereto by a screw 26 threaded within the end of the spindle. The gear housing 12 defines a cylindrical chamber extending rearwardly from the face 14 to a shoulder 28, and a ball bearing assembly 36 adapted for supporting the radial and thrust loads on the spindle shaft 20 is snugly received within the chamber against the shoulder. A forward cover 34 secured against the face 14 of the gear housing by machine screws 35 provides a shoulder 38 engaging the outer race of the bearing assembly 36 to prevent axial movement of the bearing.

Rotatably mounted within the lower portion of the gear housing directly below, substantially within the axial confines of the spindle assembly, substantially coextensive with the spindle assembly, and about an axis which is parallel to the axis of the spindle assembly is an armature 40 of a reversible electric motor designated by the numeral 42. The armature shaft 44 extends rearwardly within a needle bearing 46 supported by the gear housing 12 to a drive gear 80 formed thereon of less diameter than the shaft to permit forward removal of the armature without removal of the needle bearing 46. Rearwardly of the gear housing 12 is a gear housing cover 48 fixed against the face 16 thereof by machine screws (not shown), and which defines with the gear housing 12 a gear chamber 54 enclosed to prevent the leakage of lubricant. Within this gear chamber are mounted a pair of intermediate shafts 56 and 58 having axes parallel to the axes of the spindle shaft and motor but laterally offset from the plane of the shaft and motor axes. The intermediate shaft 56 is mounted within the gear housing 12 and gear housing cover 48 by needle bearing assemblies 60 and 62, respectively, and the intermediate shaft 58 is snugly received within openings in the gear housing and cover. Similar to the intermediate shaft 56, the spindle shaft 20 is rotatably mounted adjacent its rear end by a needle bearing assembly 64 supported by the gear housing cover.

A driving connection is provided between the drive motor and the spindle shaft by a plurality of spur gears including a gear 66 keyed to the spindle shaft and engaging a gear 68 fixed to the intermediate shaft 56, a gear 70 fixed to the intermediate shaft 56 and engaging a gear 72 rotatably mounted on the intermediate shaft 58 with a bushing 74, and a gear 76 fixed on the gear 72 and engaging the drive gear 80 on the armature shaft. This drive mechanism, it can be seen, provides a drive to the spindle shaft moving the spindle in the rotational direction opposite the rotational direction of the armature shaft and at a rotational speed substantially less than the armature.

A motor housing 90 is mounted on the lower portion of the face 14 of the gear housing 12 by machine screws 94 (one shown in FIG. 2) to form a housing extension directly below the spindle chuck. The field 96 of the drive motor is fastened to the motor housing by the machine screws 98 thereby enabling the entire motor assembly to be removed with the motor housing. On the forward end of the motor housing are a pair of commutator brush assemblies 100 having brushes 102 in engagement with the armature commutator 104 for supplying power to the armature in the conventional manner, and forwardly of the commutator brush assembly is a transverse arch 106 forming an integral part of the motor housing 90 and defining centrally thereof a cylindrical opening 108 receiving an armature shaft bearing assembly 110 against a shoulder 111. A motor housing cover 112 is fastened to the forward end of the motor housing by machine screws 114 and provides a forward end face for the motor housing which includes a central transverse portion 116 covering the transverse arch 106 and a plurality of webs 118 extending vertically from opposite sides of the transverse portion 116 to the periphery of the motor housing cover.

To the rear of the drive motor armature 40 is a centrifugal fan 120 fixed to the armature shaft 44 and contoured with the housing 12 for directing cooling air forward from the aligned inlet openings 124 and 126 in the gear housing cover and gear housing, respectively, around the armature of the drive motor through side vents in the motor housing cover or, as shown, through vents located adjacent the cutting area as between the webs 118 for blowing chips and other particles away from the cutting region of the chuck supported tool.

The motor armature 40 is conveniently secured against axial movement by a sleeve 128 interposed between the inner race of the ball bearing assembly 110 and a collar 130 on the armature shaft, and by a plurality of washers or shims 132 interposed between the fan 120 and a shoulder 134 on the gear housing 12. The spindle 20 is secured against axial movement by a spindle shaft collar 137 and a sleeve 136 engaging opposite sides of the inner race of the ball bearing assembly 36 and by a locking ring 138 secured within an annulus of the spindle shaft and holding the spur gear 66 against the sleeve 136.

The forward cover 34 extends forwardly of the gear housing above the motor housing to provide a chuck housing having an inverted U-shaped portion 86 extending about the rear end of the chuck in contiguous relation therewith to prevent contact with the irregular contour of the chuck and to act as a seal preventing access by metallic chips, etc. with the bearing 36. A bridging portion 88 of the chuck housing 34 connects the lower ends of the legs of the U-shaped portion 86 to substantially enclose the space between the chuck and the motor housing and thereby prevent inadvertent injury of the operator by the rotating chuck.

Extending downwardly from the drill housing 10 in the plane of the spindle and motor axes is a trigger handle 140 having a rear handle portion 142 secured to the lower end of the gear housing 12 by machine screws 144 (FIG. 2) and a forward plastic handle portion 146 secured to the rear handle portion by machine screws 148. In the usual manner, the electric cord supplying power to the drive motor is received within an opening in the outer end of the trigger handle, and suitable leads 150 are connected between the armature brushes, the electric cord and a trigger operated switch 152 having a locking pin 158 and a forward-reverse control button 156.

In conjunction with the trigger handle 140, the hand drill may be supported either with a spade handle 160 extending rearwardly in a plane of the spindle subassembly perpendicular to the common plane of the spindle and armature axes, or with an upright handle 162 threaded within a gear housing opening 163 so as to be perpendicular to and within the axial confines of the spindle subassembly. The spade handle 160 is a conventional U shape with legs 164 extending forwardly and fixed to the gear housing 12 by a pair of coaxial screws 166 threaded transversely into the gear housing openings 167 below the handle 162, and is fixed against rotation by the spade handle lugs 168 received within slots 170 on the housing. The spade handle may be readily removed and the auxiliary handle threaded within the openings for the screws 166 to support the drill for special applications, as in restricted locations necessitating a minimum drill front to rear width. All three of the drill handles are positioned close to the plane of the face of the spindle chuck thereby providing substantial leverage over and control of the drill for preventing hunting or misaligning of the drill supported tool or twisting of the drill under severe torque conditions. Additionally, the trigger handle although extending substantially at a right angle to the axis of the spindle subassembly is tilted slightly forwardly to provide a comfortable handle support for the operator.

The portable hand drill, upon break-through of its supported bit through the workpiece, may be caused to engage the workpiece, and to avoid the shock and damage accompanying such engagement, a bumper 172 of resilient material is fixed upon the motor housing cover 112 to extend forwardly of the face 173 of the chuck 24. This bumper 172 is secured by means of a pair of rearwardly extending lugs 174 having an interfitting engagement with the transverse portion 116 of the motor housing cover.

For driving an accessory operating alone or in conjunction with the normal drill operation, a hexagonal opening 176 in the rear end of the spindle shaft 20 provides means for coupling a power take-off extending through an opening 178 in the gear housing cover 48 normally closed by a cap 180. Alternatively, as shown in FIG. 3, the gear housing cover 48 may be replaced by a modified gear housing cover 182 having an additional power take-off shaft 186 rotatably supported by a bushing 184 for alignment and coupling with the spindle shaft 20. A collar 188 fixed to the power take-off shaft holds the shaft against axial movement through its engagement with a shoulder 190 of the gear housing cover and with a snap ring 192. The power take-off shaft is shown driving a screw 194 threaded within a supporting fixture 196 for automatically feeding the drill forwardly into cutting engagement with a board 198 clamped between fingers 200 and 202 of the supporting fixture. As best shown in FIG. 4, the clamping fingers 200 and 202 are relatively adjustable for forming a vise adjustable by a vise screw 208 threaded within a crossbar 210 fixed to the movable fingers 202. Additionally, the distance between the drilled hole and the lower surface of the board may be controlled by the manually adjustable screws 212, and the fixture supports the hand drill during the forward or return feed thereof by a pair of rails 204 engaging the opposed shoulders 206 (FIG. 2) formed on the sides of the drill housing.

The portable power tool of the present invention, therefore, has a very compact and well-balanced construction that is readily handled for safe and efficient operation and which is adaptable for restricted and hard-to-reach locations and for supplying accessory power alone or in conjunction with conventional drilling. Further, the power tool of this invention has a simple and rugged construction that is capable of rapid assembly and disassembly for economical manufacture and ease in maintenance.

As will be apparent to persons skilled in the art, various modifications and adaptations of the structure above described will become readily apparent without departure from the spirit and scope of the invention, the scope of which is defined in the appended claims.

I claim:

1. A compact portable hand drill comprising a substantially L-shaped drill housing having an upper relatively narrow housing portion and a lower laterally extending relatively broad housing portion with a forward lateral extension forwardly of the upper housing portion having a forward end face; an electric motor mounted in the lower housing portion in part within the forward lateral extension having a laterally extending motor shaft extending rearwardly to the rear of the L-shaped housing, a spindle shaft rotatably mounted in the upper housing portion in parallel relationship with and substantially within the axial confines of the electric motor, the spindle shaft having a forward end forwardly of the upper housing portion and rearwardly of the forward end face of the forward lateral extension, a drill chuck mounted on the forward end of the spindle shaft externally of the L-shaped drill housing and adjacent to, directly above, and in substantially laterally coextensive relationship with the forward lateral extension of the lower housing portion, gear means within the rear of the L-shaped housing providing a drive connection between the rear end of the motor shaft and the rear end of the spindle shaft, and handle means on the housing for manipulation of the hand drill including a first handle extending downwardly from the L-shaped housing.

2. The compact portable hand drill of claim 1 further comprising a motor driven fan mounted for rotation about the axis of the motor shaft for forcing cooling air forwardly through the lower housing portion, and wherein the forward end face of the forward lateral extension has an air outlet opening in fluid connection with the motor fan for directing the cooling air forwardly from the motor housing.

3. The compact portable hand drill of claim 1 wherein the drill chuck has a generally cylindrical mounting portion fixed to the forward end of the spindle shaft and wherein the drill housing further comprises protective means between the cylindrical mounting portion of the drill chuck and the forward lateral extension of the housing substantially enclosing the space therebetween.

4. A compact portable hand drill comprising a substantially L-shaped drill housing having an upper relatively narrow upright housing portion and a lower relatively broad laterally extending housing portion with a forward lateral extension forwardly of the upper housing portion; said L-shaped housing having L-shaped sides forming side walls for the upper and lower housing portions, a bottom forming a bottom wall for the lower housing portion, a top forming a top wall for the upper housing portion, a front forming a forward end face for the lower housing portion, and a back forming a rear wall for the upper and lower housing portions; a laterally extending electric motor mounted in the lower housing portion between the forward end face and the rear wall, the electric motor having a laterally extending motor shaft extending rearwardly to adjacent the rear wall; a laterally extending spindle assembly above the electric motor and in substantially laterally coextensive relationship therewith comprising a spindle shaft rotatably mounted in the upper housing portion having a forward end forwardly of the upper housing portion and rearwardly of the forward end face of the lower housing portion, and a drill chuck detachably mounted on the forward end of the spindle shaft externally of the L-shaped housing and adjacent to, directly above and in substantially coextensive relationship with the forward lateral extension of the lower housing portion; gear means within the rear of the L-shaped housing providing a drive connection between the rear end of the motor shaft and the rear end of the spindle shaft, and handle means on the housing for manipulation of the hand drill including a first handle extending downwardly from the L-shaped housing.

5. The compact portable hand drill of claim 4 wherein the motor shaft axis and the spindle shaft axis lie in a common plane; wherein said first handle is a trigger handle extending downwardly from the lower end of the drill housing in the common plane of the motor and shaft axes and at a substantially right angle to the spindle shaft axis; and wherein the handle means further comprises a spade handle and means providing for detachably mounting the spade handle rearwardly of the spindle assembly in a plane substantially perpendicular to said common plane.

6. The compact portable hand drill of claim 4 wherein the handle means further includes a spade handle, first mounting means for detachably mounting the spade handle rearwardly of the spindle assembly so that the spade handle may be removed for diminishing the front to rear width of the portable hand drill, an auxiliary handle, and second mounting means for selectively mounting the auxiliary handle to the top and to the sides of the L-shaped housing.

7. A compact portable hand drill comprising a substantially L-shaped drill housing having an upper relatively narrow housing portion and a lower laterally extending relatively broad housing portion with a forward lateral extension forwardly of the upper housing portion having a forward end face; an electric motor mounted in the lower housing portion in part within the forward lateral extension having a laterally extending motor shaft extending rearwardly to the rear of the L-shaped housing, a spindle shaft rotatably mounted in the upper housing portion in parallel relationship with and substantially within the axial confines of the motor shaft, the spindle shaft having a forward end forwardly of the upper housing portion and rearwardly of the forward end face of the forward lateral extension, a drill chuck detachably mounted on the forward end of the spindle shaft externally of the L-shaped housing and adjacent to, directly above, and in substantially laterally coextensive relationship with the forward lateral extension of the lower housing portion; speed reducer transmission means within the rear of the L-shaped housing connecting the rear end of the motor shaft with the rear end of the spindle shaft, a spade handle, means for detachably mounting the spade handle to the housing rearwardly of the spindle shaft, and a fixed handle extending downwardly from the housing, the spindle shaft and the drill chuck mounted on the forward end thereof forming a spindle assembly which is substantially laterally coextensive with the electric motor whereby the axial dimension of the electric motor substantially determines the front to rear width of the portable hand drill which is therefore dependent primarily upon the size and accordingly the power of the electric motor.

References Cited by the Examiner

UNITED STATES PATENTS

| | | | |
|---|---|---|---|
| 1,385,458 | 7/1921 | Kimman | 77—7 |
| 1,647,396 | 11/1927 | Decker | 77—6 |
| 2,468,469 | 4/1949 | Smith | 310—50 |
| 2,963,913 | 12/1960 | Wenscoff | 77—7 |
| 2,978,931 | 4/1961 | Broden | 77—7 |
| 3,077,547 | 2/1963 | Metko | 310—50 |

FOREIGN PATENTS

| | | |
|---|---|---|
| 433,013 | 8/1935 | Great Britain. |
| 436,454 | 10/1935 | Great Britain. |

WILLIAM W. DYER, Jr., *Primary Examiner.*

FRANCIS S. HUSAR, *Examiner.*